US012620416B2

(12) United States Patent
Li

(10) Patent No.: US 12,620,416 B2
(45) Date of Patent: May 5, 2026

(54) VIDEO EDITING METHOD, APPARATUS, DEVICE AND MEDIUM

(71) Applicant: Beijing Zitiao Network Technology Co., Ltd., Beijing (CN)

(72) Inventor: Xinwei Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 95 days.

(21) Appl. No.: 18/574,678

(22) PCT Filed: Nov. 8, 2023

(86) PCT No.: PCT/CN2023/130565
§ 371 (c)(1),
(2) Date: Dec. 27, 2023

(87) PCT Pub. No.: WO2024/099376
PCT Pub. Date: May 16, 2024

(65) Prior Publication Data
US 2025/0078872 A1 Mar. 6, 2025

(30) Foreign Application Priority Data
Nov. 8, 2022 (CN) .......................... 202211394550.7

(51) Int. Cl.
*G11B 27/031* (2006.01)
*G11B 27/34* (2006.01)
*H04N 21/845* (2011.01)

(52) U.S. Cl.
CPC ............ *G11B 27/031* (2013.01); *G11B 27/34* (2013.01); *H04N 21/845* (2013.01)

(58) Field of Classification Search
CPC ..... G11B 27/031; G11B 27/34; G11B 27/036; H04N 21/845; H04N 21/44; H04N 21/472;
(Continued)

(56) References Cited

U.S. PATENT DOCUMENTS

| | | | |
|---|---|---|---|
| 2008/0247726 A1 | 10/2008 | Lee et al. | |
| 2015/0302893 A1* | 10/2015 | Shannon | ................ G11B 27/34 386/239 |

(Continued)

FOREIGN PATENT DOCUMENTS

| | | |
|---|---|---|
| CN | 103839562 A | 6/2014 |
| CN | 105307028 A | 2/2016 |

(Continued)

OTHER PUBLICATIONS

European Patent Application No. 23821860.6; Extended Search Report; dated Feb. 26, 2025; 9 pages.

(Continued)

*Primary Examiner* — Loi H Tran
(74) *Attorney, Agent, or Firm* — BakerHostetler

(57) ABSTRACT

Embodiments of the present disclosure relate to video editing. A method comprises: displaying a video editing draft which records filming indication information and an image material footage of at least one storyboard shot, wherein an image material footage of a target storyboard shot of the at least one storyboard shot is filmed by a second device; displaying a video editing interface based on the video editing draft; presenting on the editing track an operation indicator, and presenting on a preview player an editing effect produced by applying the editing operation to the image material footage, and generating a target video. In this way, the efficiency of video editing is improved through the cooperation between the first device and the second device.

20 Claims, 7 Drawing Sheets

Obtain and display a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot — 101

In response to a clipping instruction triggered for the video editing draft, display a video editing interface based on the video editing draft, wherein the video editing interface includes an editing track and at least one video track segment is placed on a video track of the editing track, the at least one video track segment being formed based on the image material footage of the at least one storyboard shot — 102

In response to an editing operation for the video track segment, present on the editing track an operation indicator, and presenting on a preview player an editing effect produced by applying the editing operation to the image material footage, and generating a target video based on the editing operation applied on the video clipping interface and the image material footage — 103

(58) Field of Classification Search
CPC ...... H04N 21/854; H04N 23/64; H04N 21/81;
H04N 21/816; H04N 21/47205; H04N
21/8456
USPC ........................................................ 386/278
See application file for complete search history.

(56) References Cited

U.S. PATENT DOCUMENTS

| | | | | |
|---|---|---|---|---|
| 2017/0062009 | A1* | 3/2017 | Clifton | G11B 27/031 |
| 2018/0081909 | A1* | 3/2018 | Higashibeppu | G06F 16/5866 |
| 2021/0304468 | A1* | 9/2021 | Doggett | G11B 27/031 |
| 2023/0353844 | A1 | 11/2023 | Li et al. | |

FOREIGN PATENT DOCUMENTS

| | | | |
|---|---|---|---|
| CN | 113473204 | A | 10/2021 |
| CN | 114567819 | A | 5/2022 |
| CN | 115297272 | A | 11/2022 |
| EP | 1377045 | A2 | 1/2004 |
| EP | 4322537 | A1 | 2/2024 |
| JP | 2004-032277 | A | 1/2004 |
| JP | 2004-165806 | A | 6/2004 |
| JP | 2005-051708 | A | 2/2005 |
| JP | 2009-141959 | A | 6/2009 |
| JP | 2018-157407 | A | 10/2018 |
| WO | WO 2022/143924 | A1 | 7/2022 |
| WO | WO 2022/228553 | A1 | 11/2022 |

OTHER PUBLICATIONS

Japan Patent Application No. 2023-579183; Notice of Reasons for Refusal; dated Feb. 4, 2025; 8 pages.
International Patent Application No. PCT/CN2023/130565; Int'l Search Report; dated Jan. 22, 2024; 2 pages.

* cited by examiner

Obtain and display a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot ⟋⎯ 101

In response to a clipping instruction triggered for the video editing draft, display a video editing interface based on the video editing draft, wherein the video editing interface includes an editing track and at least one video track segment is placed on a video track of the editing track, the at least one video track segment being formed based on the image material footage of the at least one storyboard shot ⟋⎯ 102

In response to an editing operation for the video track segment, present on the editing track an operation indicator, and presenting on a preview player an editing effect produced by applying the editing operation to the image material footage, and generating a target video based on the editing operation applied on the video clipping interface and the image material footage ⟋⎯ 103

FIG. 1

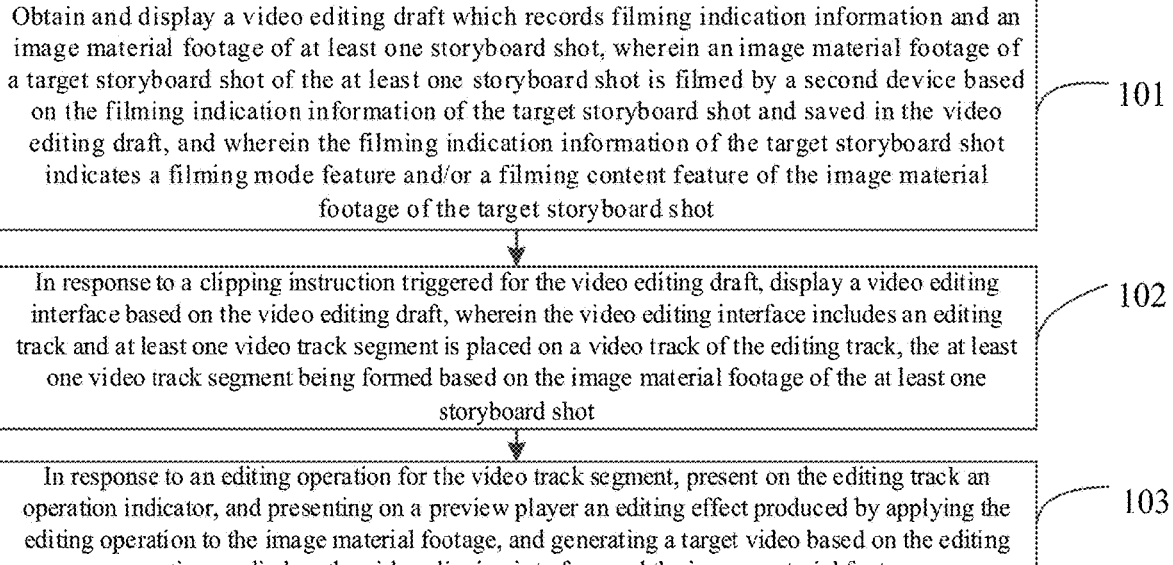

Video editing draft

| Outline | Storyboard description | Filmed segment | Shooting scale | Camera movement | Lines text | Memo |
|---|---|---|---|---|---|---|
| In the street scene, clouds are gathering black and it is about to rain | Morning weather | | Close-up | Fixed | Recent weather is unpredictable; it may be raining at one minute and shining the next | |

Video preview area

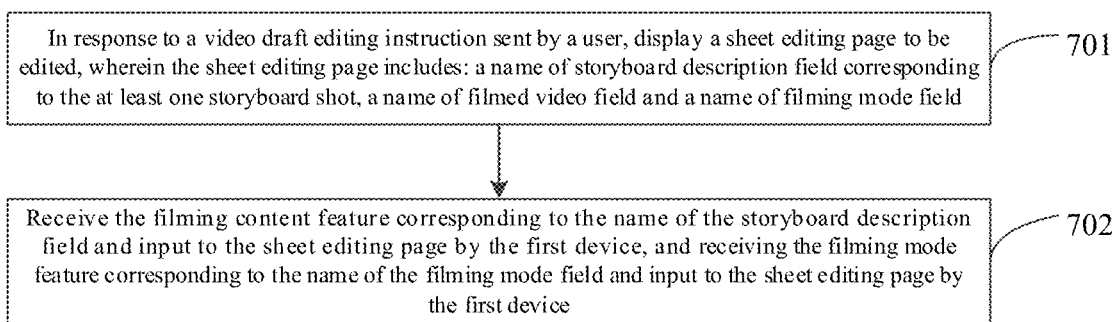

In response to a video draft editing instruction sent by a user, display a sheet editing page to be edited, wherein the sheet editing page includes: a name of storyboard description field corresponding to the at least one storyboard shot, a name of filmed video field and a name of filming mode field   — 701

Receive the filming content feature corresponding to the name of the storyboard description field and input to the sheet editing page by the first device, and receiving the filming mode feature corresponding to the name of the filming mode field and input to the sheet editing page by the first device   — 702

FIG. 7

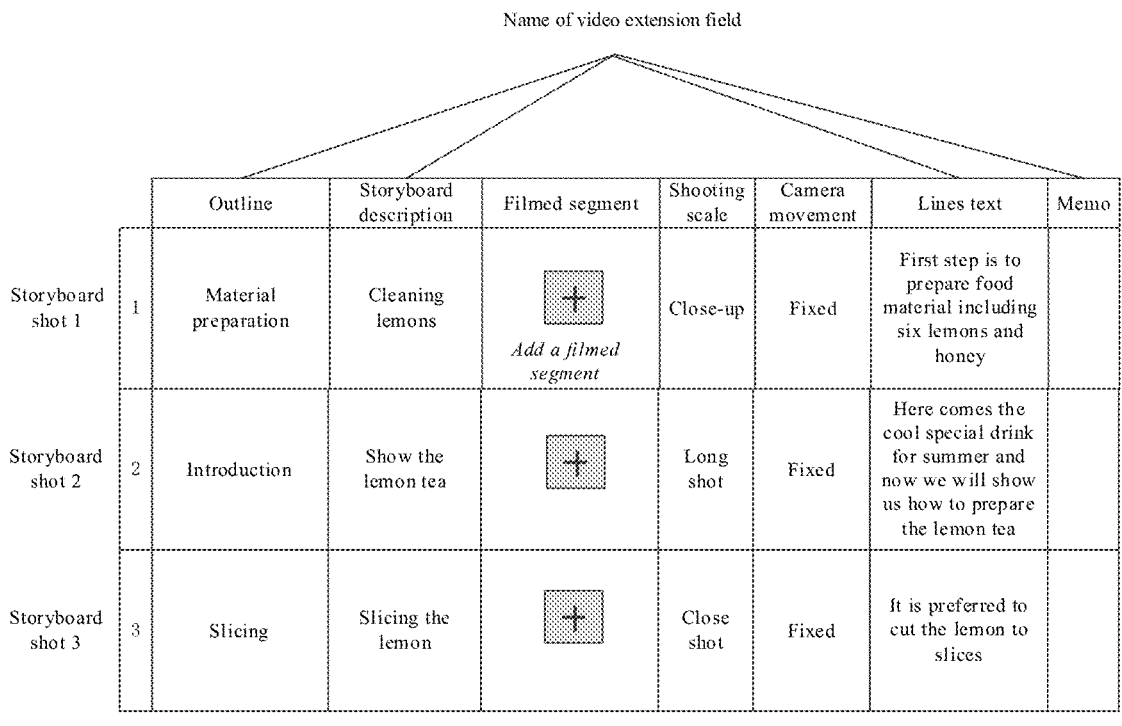

Name of video extension field

| | | Outline | Storyboard description | Filmed segment | Shooting scale | Camera movement | Lines text | Memo |
|---|---|---|---|---|---|---|---|---|
| Storyboard shot 1 | 1 | Material preparation | Cleaning lemons | *Add a filmed segment* | Close-up | Fixed | First step is to prepare food material including six lemons and honey | |
| Storyboard shot 2 | 2 | Introduction | Show the lemon tea | | Long shot | Fixed | Here comes the cool special drink for summer and now we will show us how to prepare the lemon tea | |
| Storyboard shot 3 | 3 | Slicing | Slicing the lemon | | Close shot | Fixed | It is preferred to cut the lemon to slices | |

Upload control

| | Outline | Storyboard description | Filmed segment | Shooting scale | Camera movement | Lines text | Memo |
|---|---|---|---|---|---|---|---|
| 1 | Material preparation | Cleaning lemons | *Add a filmed segment* | Close-up | Fixed | First step is to prepare food material including six lemons and honey | |
| 2 | Introduction | Show the lemon tea | | Long shot | Fixed | Here comes the cool special drink for summer and now we will show us how to prepare the lemon tea | |
| 3 | Slicing | Slicing the lemon | | Close shot | Fixed | It is preferred to cut the lemon to slices | |

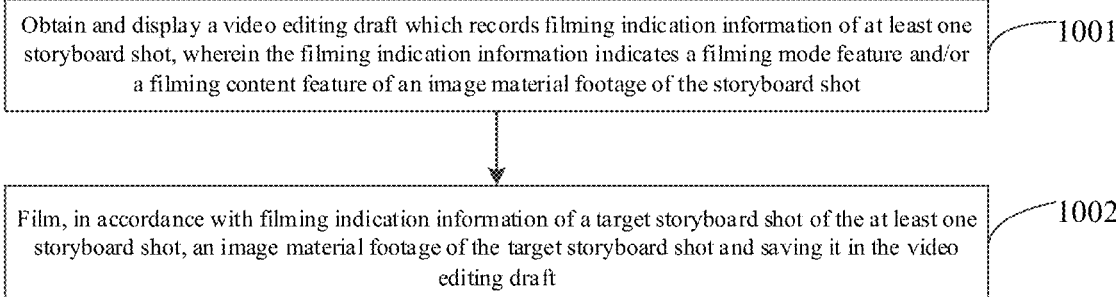

Obtain and display a video editing draft which records filming indication information of at least one storyboard shot, wherein the filming indication information indicates a filming mode feature and/or a filming content feature of an image material footage of the storyboard shot — 1001

Film, in accordance with filming indication information of a target storyboard shot of the at least one storyboard shot, an image material footage of the target storyboard shot and saving it in the video editing draft — 1002

FIG. 10

VIDEO EDITING METHOD, APPARATUS, DEVICE AND MEDIUM

CROSS-REFERENCE OF RELATED APPLICATIONS

The present application is a national phase application of International Application No. PCT/CN2023/130565, filed on Nov. 8, 2023, which claims a priority right of the Chinese patent application No. 202211394550.7 filed on Nov. 8, 2022, entitled "VIDEO EDITING METHOD, APPARATUS, DEVICE AND MEDIUM", the disclosures of which are incorporated herein by reference in their entireties.

FIELD

The present disclosure relates to the field of computer application technology, and more specifically, to a video editing method, apparatus, device and medium.

BACKGROUND

With the advance of computer technology, the video has become the mainstream carrier for information sharing and propagation, for example, food is promoted in the form of videos.

However, as the videos are increasingly applied to more and more promotion scenarios, the editing requirements for the video have become more diversified. The video could not be efficiently edited at the mobile device end due to its restricted size of screen for editing.

SUMMARY

To fully or at least partly address the above technical problem, the present disclosure provides a video editing method, apparatus, device and medium. The efficiency of video editing is promoted through the cooperation between the first device and the second device.

Embodiments of the present disclosure provide a method for video editing. The method is applied to the first device and comprises: obtaining and displaying a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot; in response to a clipping instruction triggered for the video editing draft, displaying a video editing interface based on the video editing draft, wherein the video editing interface includes an editing track and at least one video track segment is placed on a video track of the editing track, the at least one video track segment being formed based on the image material footage of the at least one storyboard shot; in response to an editing operation for the video track segment, presenting on the editing track an operation indicator, and presenting on a preview player an editing effect produced by applying the editing operation to the image material footage, and generating a target video based on the editing operation applied on the video clipping interface and the image material footage.

Embodiments of the present disclosure provide a method for video editing. The method is applied to the second device and comprises: obtaining and displaying a video editing draft which records filming indication information of at least one storyboard shot, wherein the filming indication information indicates a filming mode feature and/or a filming content feature of an image material footage of the storyboard shot; filming, in accordance with filming indication information of a target storyboard shot of the at least one storyboard shot, an image material footage of the target storyboard shot and saving it in the video editing draft, wherein the video editing draft is a video editable by a first device according to the method of the first aspect to obtain a target video.

Embodiments of the present disclosure provide an apparatus for video editing. The apparatus is applied to the first device and comprises: a first draft displaying module for obtaining and displaying a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot; an editing interface display module for in response to a clipping instruction triggered for the video editing draft, displaying a video editing interface based on the video editing draft, wherein the video editing interface includes an editing track and at least one video track segment is placed on a video track of the editing track, the at least one video track segment being formed based on the image material footage of the at least one storyboard shot; an editing processing module for in response to an editing operation for the video track segment, presenting on the editing track an operation indicator, and presenting on a preview player an editing effect produced by applying the editing operation to the image material footage, and generating a target video based on the editing operation applied on the video clipping interface and the image material footage.

Embodiments of the present disclosure provide an apparatus for video editing. The apparatus is applied to the second device and comprises: a second draft displaying module for obtaining and displaying a video editing draft which records filming indication information of at least one storyboard shot, wherein the filming indication information indicates a filming mode feature and/or a filming content feature of an image material footage of the storyboard shot; a filming processing module for filming, in accordance with filming indication information of a target storyboard shot of the at least one storyboard shot, an image material footage of the target storyboard shot and saving it in the video editing draft, wherein the video editing draft is a video editable according to the apparatus for video editing described above mainly from the first device side to obtain a target video.

Embodiments of the present disclosure also provide an electronic device comprising: a processor; and a memory storing instructions executable by the processor; wherein the processor is configured to read the executable instructions from the memory and execute the instructions to implement the method for video editing provided by the embodiments of the present disclosure.

Embodiments of the present disclosure also provide a computer-readable storage medium storing computer programs for executing the method for video editing provided by the embodiments of the present disclosure.

Embodiments of the present disclosure further provide a computer program product characterized in that instructions in the computer program product, when executed by a processor, implement the method for video editing provided by the embodiments of the present disclosure.

Compared to the prior art, the technical solution provided by the embodiments of the present disclosure achieves following advantages:

The video editing solution provided by the embodiments of the present disclosure obtains and displays a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot. Moreover, the video editing solution displays, in response to a clipping instruction triggered for the video editing draft, a video editing interface based on the video editing draft, wherein the video editing interface includes an editing track and at least one video track segment is placed on a video track of the editing track, the at least one video track segment being formed based on the image material footage of the at least one storyboard shot. Further, the video editing solution presents, in response to an editing operation for the video track segment, on the editing track an operation indicator and presenting on a preview player an editing effect produced by applying the editing operation to the image material footage, and generating a target video based on the editing operation applied on the video clipping interface and the image material footage. In the embodiments of the present disclosure, the efficiency of video editing is improved through the cooperation between the first device and the second device, where the second device films the video and the first device edits the video.

BRIEF DESCRIPTION OF THE DRAWINGS

Through the following detailed implementations with reference to the accompanying drawings, the above and other features, advantages and aspects of various embodiments of the present disclosure will become more apparent. Throughout the drawings, same or similar reference signs indicate same or similar elements. It is to be understood that the drawings are exemplary, in which original components and elements are not necessarily drawn to scale.

FIG. 1 illustrates a flowchart of the method for video editing provided by embodiments of the present disclosure;

FIG. 2 illustrates a schematic diagram of a video editing scenario provided by embodiments of the present disclosure;

FIG. 7 illustrates a flowchart of a further method for video editing provided by embodiments of the present disclosure;

FIG. 8 illustrates a schematic diagram of a further video editing scenario provided by embodiments of the present disclosure;

FIG. 9 illustrates a schematic diagram of a further video editing scenario provided by embodiments of the present disclosure;

FIG. 10 illustrates a flowchart of a further method for video editing provided by embodiments of the present disclosure;

DETAILED DESCRIPTION OF EMBODIMENTS

Figure 3:
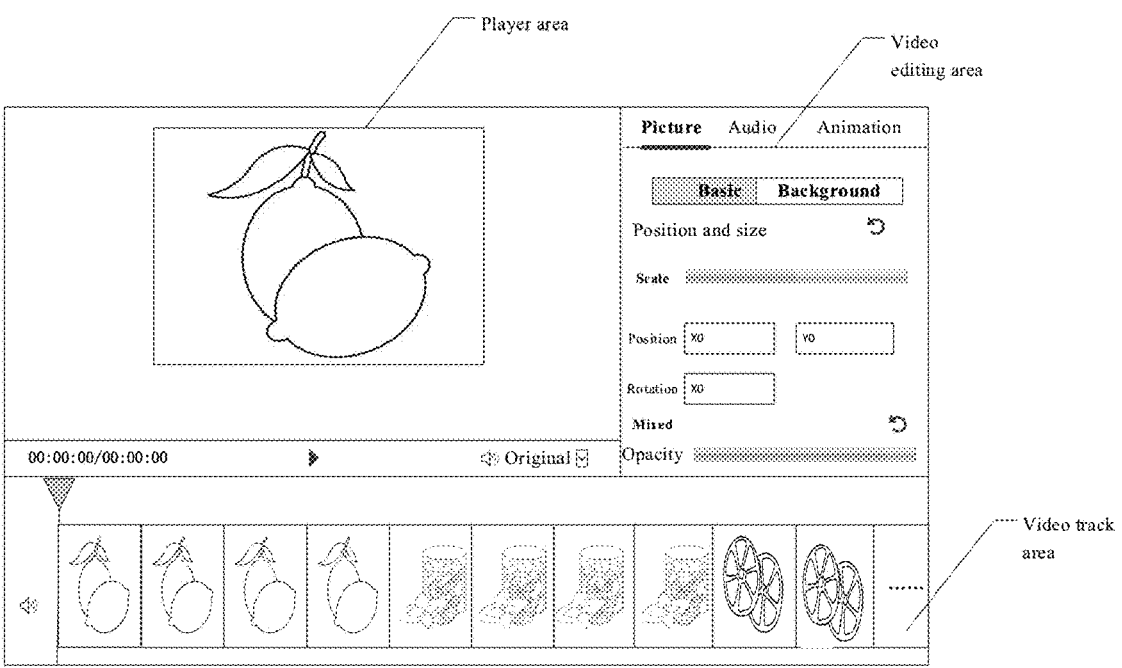
FIG. 3 illustrates a schematic diagram of a further video editing scenario provided by embodiments of the present disclosure.
Figure 4:
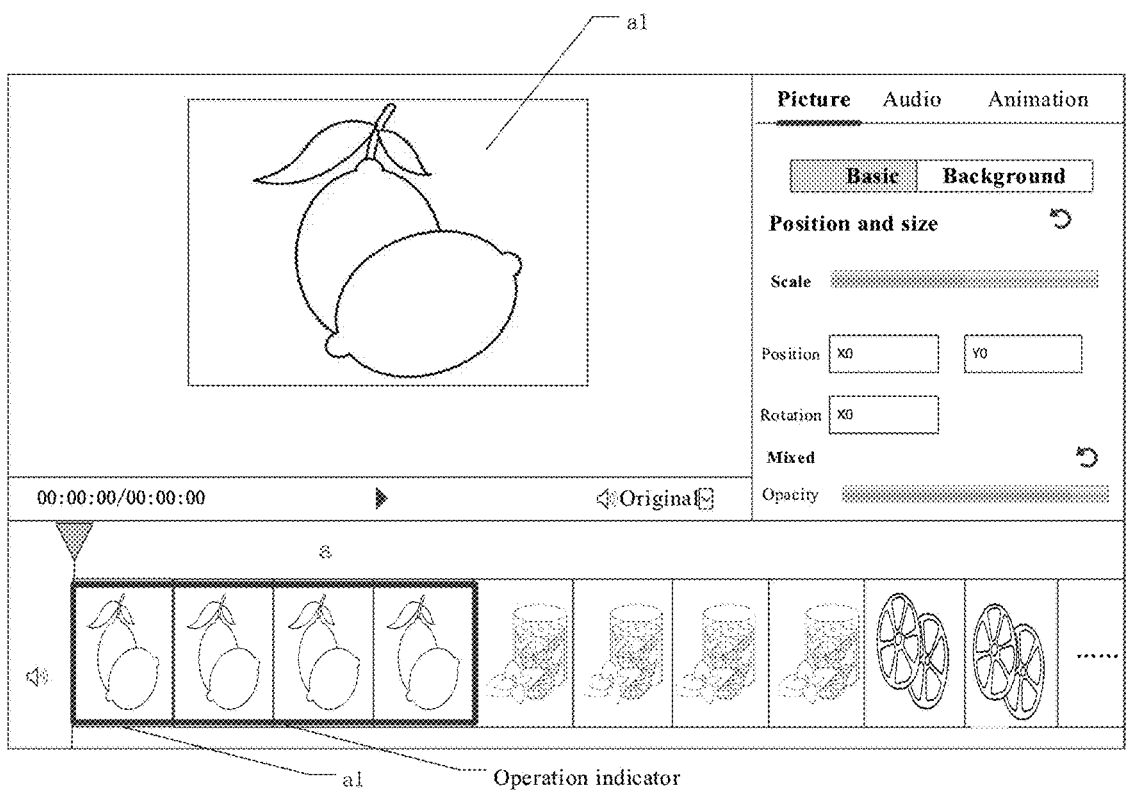
FIG. 4 illustrates a schematic diagram of a further video editing scenario provided by embodiments of the present disclosure.

The embodiments of the present disclosure will be described in more details with reference to the drawings. Although the drawings illustrate some embodiments of the present disclosure, it should be appreciated that the present disclosure can be implemented in various manners and should not be limited to the embodiments explained herein. On the contrary, the embodiments are provided to make the present disclosure more thorough and complete. It should be appreciated that the drawings and the embodiments of the present disclosure are provided only for exemplary purpose, rather than restricting the protection scope of the present disclosure.

It is to be understood that respective steps disclosed in the method implementations of the present disclosure may be executed in different orders and/or in parallel. Besides, the method implementations may include additional steps and/or omit the demonstrated steps. The scope of the present disclosure is not restricted in this regard.

As used herein, the term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." The term "some embodiments" is to be read as "at least some embodiments". Definitions of other terms may be provided in the following description.

It is to be noted that "first" and "second" are disclosed in the present disclosure merely for distinguishing different apparatuses, modules or units, rather than restricting the sequence of the functions executed by the apparatuses, modules or units or the interdependency among the apparatuses, modules or units.

It is to be noted that the terms "one" and "more" disclosed in the present disclosure are exemplary rather than restrictive. Those skilled in the art should understand that the above terms are to be read as "one or more" unless indicated otherwise in the context.

Names of the messages or information exchanged between a plurality of apparatuses in the implementations of the present disclosure are provided only for explanatory purpose, rather than restricting the scope of the messages or information.

To address the above problem, embodiments of the present disclosure provide a method for video editing, in which a second device cooperates with a first device, wherein the second device may be a portable mobile terminal like smartphone. The second device may film a video segment in a more flexible way due to its lightweight. The first device may be a more professional device with a large screen such as computer. When the video is edited at the first device end, the video editing process becomes smoother and more editing functions are supported. Accordingly, the efficiency of video editing is improved.

With reference to the detailed embodiments below, the method is first introduced from the first device side.

FIG. 1 illustrates a flowchart of the method for video editing provided by the embodiments of the present disclosure. The method may be executed by a video editing apparatus in the first device, wherein the apparatus may be implemented by software and/or hardware and may generally be integrated in an electronic device corresponding to the first device. As shown in FIG. 1, the method comprises:

Step 101: obtaining and displaying a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot.

In this embodiment, a complete video may be split into a plurality of storyboard shots and each storyboard shot may be regarded as an image material footage. Since the second device is more portable and flexible as stated above, the image material footage of the target storyboard shot of the at least one storyboard shot is filmed by a second device based on the filming indication information of the target storyboard shot and saved in the video editing draft (wherein there may be one or more second devices; the second device may save the filmed image material footage in the video editing draft by triggering a preset "save control"). The filming indication information of the target storyboard shot indicates a filming mode feature and/or a filming content feature of the image material footage of the target storyboard shot, wherein the filming mode feature indicates through which filming mode the target storyboard shot is filmed, while the filming content feature refers to the detailed content filmed in the target storyboard shot.

In one embodiment of the present disclosure, a video editing draft is obtained and displayed, where the video editing draft may be regarded as a "script" for recording the filming indication information and the image material footage of at least one storyboard shot. In the video editing draft, the user may view the image material footage corresponding to each storyboard shot of the video and the filming indication information corresponding to each storyboard shot.

For example, as shown in FIG. 2, with respect to a video that films "weather record of place A", its video editing draft contains a storyboard shot 1 of "Morning Weather". For the storyboard shot 1, its corresponding filming indication information includes the filming content feature like lines text, an outline, a storyboard shot description and memo etc., and the filming mode feature such as "close-up" in the aspect of shooting scale and "fixed" camera movement.

Step 102: in response to a clipping instruction triggered for the video editing draft, a video editing interface is displayed based on the video editing draft, wherein the video editing interface includes an editing track and at least one video track segment is placed on a video track of the editing track, the at least one video track segment being formed based on the image material footage of the at least one storyboard shot.

In one embodiments of the present disclosure, the video is edited on the first device. In this embodiment, in response to a clipping instruction triggered for the video editing draft (e.g., triggering a corresponding clipping control to obtain the clipping instruction), a video editing interface is displayed based on the video editing draft, wherein the video editing interface includes an editing track and at least one video track segment is placed on a video track of the editing track, the at least one video track segment is formed based on the image material footage of the at least one storyboard shot. In other words, in this embodiment, the image material footage of each storyboard shot may be edited again.

For example, as show in FIG. 3, the video editing interface may include a video track area, a player area and a video editing area, wherein the video track area includes at least one video track segment; the player area is provided for displaying the current video to see the video editing effect straightforwardly; and the video editing area is used for displaying a variety of editing function controls for the video. The video track segment in the video may be edited based on an operation for triggering the editing control in the video editing area, wherein the editing control may include video rotation, video position adjustment and video transparency adjustment etc.

Step 103: in response to an editing operation for the video track segment, an operation indicator is present on the editing track and an editing effect produced by applying the editing operation to the image material footage is present on a preview player, and a target video is generated based on the editing operation applied on the video clipping interface and the image material footage.

In one embodiment, in response to an editing operation for the video track segment, an operation indicator is present on the editing track. For example, schematic diagram of the operation block may be provided for corresponding video track segment as the operation indicator, where the operation indicator is provided to visually demonstrate the image material footage on the video track segment being edited. Besides, an editing effect produced by applying the editing operation to the image material footage is present on the preview player (e.g., player area in FIG. 3). For example, when the video frame al in the image material footage is being edited, the editing effect of al is present on the preview player synchronously. Furthermore, a target video is generated based on the editing operation applied on the video clipping interface and the image material footage.

It should be appreciated that the video usually includes the lines information besides the image material footage. Accordingly, in one embodiment of the present disclosure, at least one lines track segment is placed on a lines track of the editing track, the at least one lines track segment being formed based on lines text of the at least one storyboard shot. The lines text may be understood as the subtitle information corresponding to the image material footage.

Figure 5:
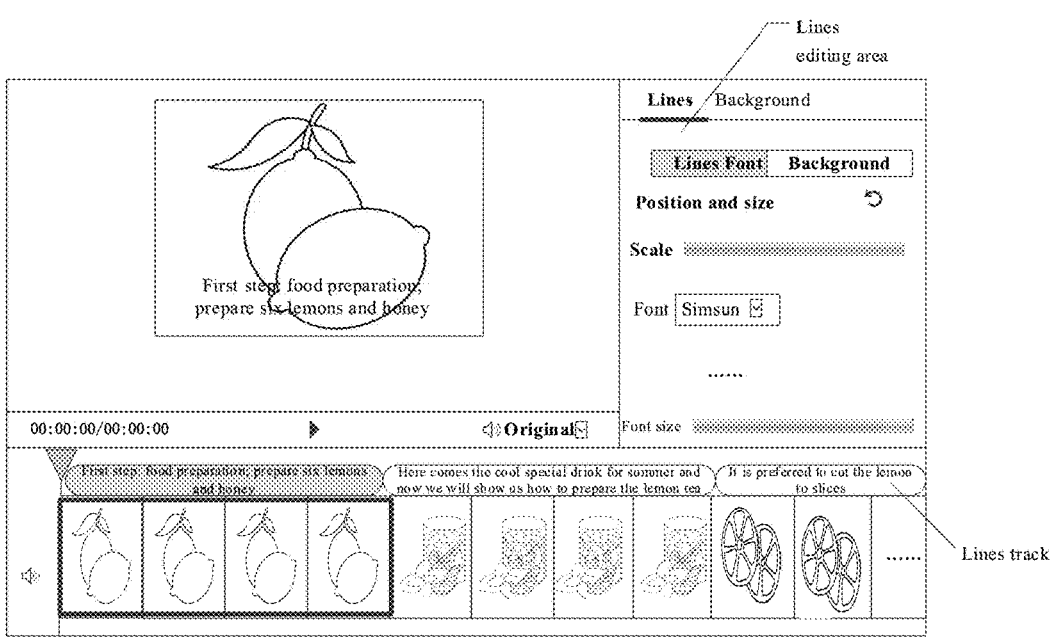
FIG. 5 illustrates a schematic diagram of a further video editing scenario provided by embodiments of the present disclosure.

In this embodiment, in response to an editing operation for the line track segment, an operation indicator is present on the editing track, which operation indicator is provided to indicate that the corresponding lines are in editing state. For example, the corresponding lines track segment may be highlighted as the operation indicator. In this embodiment, continuing with the scenario illustrated in FIG. 3, a lines editing area may be displayed as demonstrated by FIG. 5. The lines editing area includes multiple functional controls that edit the lines text, including but not limited to, control for adjusting the font of the lines etc. In this embodiment, the editing effect resulted from applying the editing operation on the lines text may be synchronously present on the preview player to visually display the editing effects on the lines.

In one embodiment of the present disclosure, to further satisfy the video editing needs, the image material footage corresponding to each storyboard shot may be pre-edited before the editing of the video.

In this embodiment, in response to a clipping instruction for a target image material footage selected from the video editing draft, a clipping interface of the target image material footage is displayed, wherein related clipping materials and clipping function controls may be called in the clipping interface. No specific examples are provided here.

In other words, in this embodiment, only the target image material footage is clipped. In accordance with a clipping operation on the target image material footage by the user in the clipping interface, a clipped and updated image material footage is obtained, and the target image material footage is substituted with the updated image material footage in the video editing draft.

Figure 6:
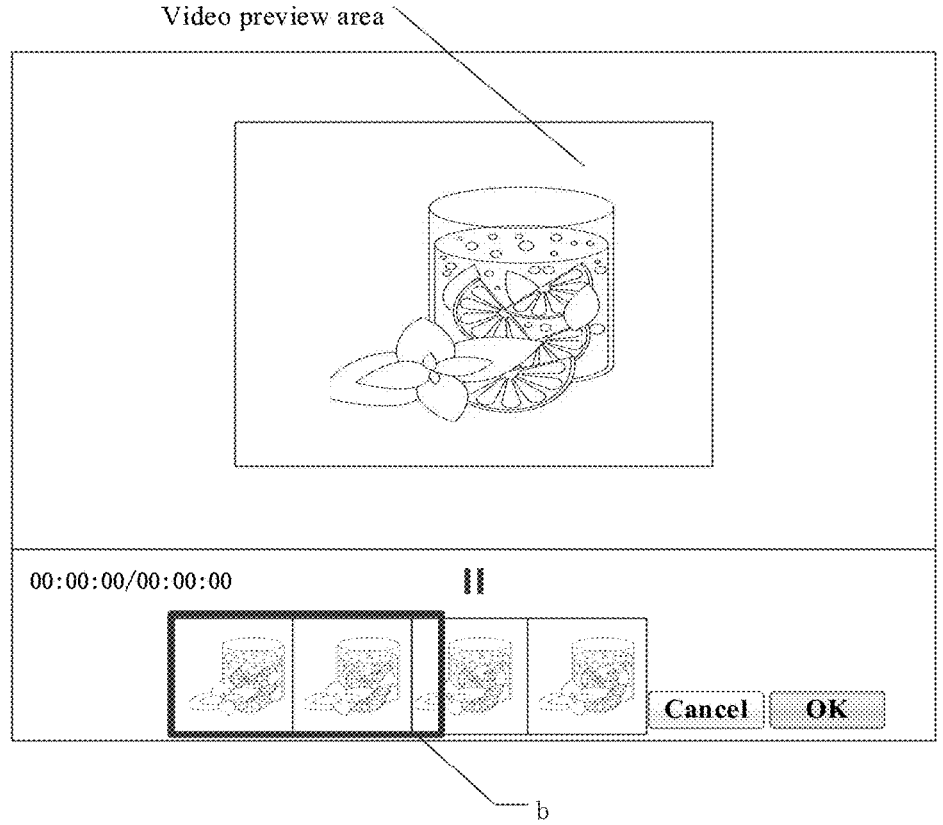
FIG. 6 illustrates a schematic diagram of a further video editing scenario provided by embodiments of the present disclosure.

For example, as shown in FIG. 6, when the video editing draft includes the target image material footage b, a clipping interface of b is displayed when the material footage b is clicked. The footage b may be clipped on the clipping interface, wherein the clipping interface of b includes a video preview area of b and the video preview area is provided for visually displaying the editing effect of the corresponding video frame in the currently edited footage b.

In summary, the method for video editing in accordance with embodiments of the present disclosure comprises: obtaining and displaying a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot. The method also comprises: in response to a clipping instruction triggered for the video editing draft, displaying a video editing interface based on the video editing draft, wherein the video editing interface includes an editing track and at least one video track segment is placed on a video track of the editing track, the at least one video track segment being formed based on the image material footage of the at least one storyboard shot. The method further comprises: in response to an editing operation for the video track segment, presenting on the editing track an operation indicator and on a preview player an editing effect produced by applying the editing operation to the image material footage, and generating a target video based on the editing operation applied on the video clipping interface and the image material footage. In the embodiments of the present disclosure, the efficiency of video editing is boosted by the cooperation between the first device and the second device, wherein the second device films the video and the first device edits the video.

It is to be explained that the video editing draft is obtained in different ways depending on the application scenarios. Examples are illustrated below:

In one embodiment of the present disclosure, as shown in FIG. 7, the method further comprises, before obtaining and displaying the video editing draft:

Step 701: in response to a video draft editing instruction sent by a user, a sheet editing page to be edited is displayed, wherein the sheet editing page includes: a name of story-board description field corresponding to the at least one storyboard shot, a name of filmed video field and a name of filming mode field.

In this embodiment, the video editing draft is displayed in the form of sheet. The sheet editing page includes: a name of storyboard description field corresponding to the at least one storyboard shot (the subject matter only filmed by the current storyboard), a name of filmed video field (for describing the current storyboard shot, e.g., "filmed segment" etc.) and a name of filming mode field. The name of the filming mode field includes: a name of shooting scale field (e.g., long shot, close shot, close-up, medium shot, user defined etc.), and/or a name of camera movement field (such as static shot, roll shot, boom shot, pan, tilt shot, track shot and arc shot).

For example, as shown in FIG. 8, a video for "making lemon tea" includes at least three storyboard shots displayed in the form of sheet editing page. The sheet editing page includes "filmed field" as the name of the storyboard description field and "cleaning lemon" as the name of the filmed video field. The filming mode field contains shooting scale and camera movement etc.

It is to be understood that the filming mode feature may be obtained in different ways depending on the application scenarios. In some possible embodiments, in response to an operation for triggering a control corresponding to the name of the shooting scale field, a plurality of optional candidate shooting scales is displayed and a target shooting scale selected from the candidate shooting scales is input to a filling position corresponding to the name of the shooting scale field; and/or In some possible embodiments, in response to an operation for triggering a control corresponding to the name of the camera movement field, a plurality of optional candidate camera movements is displayed and a target camera movement selected from the candidate camera movements is input to a filling position corresponding to the name of the camera movement field.

Step 702 includes receiving the filming content feature corresponding to the name of the storyboard description field and input to the sheet editing page by the first device, wherein the filming content feature indicates an image material footage of a storyboard shot; and receiving the filming mode feature corresponding to the name of the filming mode field and input to the sheet editing page by the first device, wherein the filming mode feature indicates an image material footage of a storyboard shot.

During actual execution, the video may be edited by performing operations on the sheet editing page.

In one embodiment of the present disclosure, the filming content feature corresponding to the name of the storyboard description field and input to the sheet editing page by the first device is received, wherein the filming content feature indicates an image material footage of a storyboard shot; and the filming mode feature corresponding to the name of the filming mode field and input to the sheet editing page by the first device is received, wherein the filming mode feature indicates an image material footage of a storyboard shot. Accordingly, the image material footage corresponding to the target storyboard shot may be subsequently filmed in accordance with the corresponding filming content and the filming mode.

In one embodiment of the present disclosure, the sheet editing page further includes a name of video extension field. With reference to FIG. 8, the name of the video extension field includes: a combination of one or more of a name of storyboard number field (e.g., numbered according to the sequence of the storyboard shot in the video and determined the number as the name of storyboard number field), a name of video outline field (which usually is a summary of the corresponding storyboard shot function; e.g., the name of the video outline field corresponding to the storyboard shot 1 is "material preparation"), a name of lines text field (which usually is subtitle of the image material footage corresponding to the storyboard shot), a name of memo field. In this embodiment, the video extension editing information corresponding to the name of the video extension field input to the table editing page by the first device is received and displayed, to further provide more video forms and improve the video filming effects.

In one embodiment of the present disclosure, to more flexibly satisfy the video editing requirements, the sheet supports the input editing operation for any sheet cell. For example, the user may click the lines text area to support editing of the text in the text area. Besides, in some possible embodiments, the row and the column on the sheet editing page may be added voluntarily. For example, after clicking the current position, the user may add one row to the sheet at the current position by triggering a corresponding button for row addition, or add one column to the sheet at the current position by triggering a corresponding button for column addition.

To improve the addition efficiency, a control for quick row addition and/or quick column addition may be configured on the sheet editing page. Every time the control for quick row addition is triggered, a predetermined number (e.g., 5) of rows of sheet cells may be quickly added in the sheet editing page. Likewise, every time the control for quick column addition is triggered, a predetermined number (such as 5) of columns of sheet cells may be quickly added in the sheet editing page.

In one embodiment of the present disclosure, the position of the sheet cells in the sheet editing page may also be modified. For example, after corresponding sheet cells are suspended, the sheet cells are activated and the sheet is displayed in a floating and draggable form. Then, the position of the corresponding sheet cell may be adjusted by clicking and dragging. It is certain that an entire row of the sheet editing page may also be selected. When the name of the storyboard number field for each row in the sheet editing page is activated (e.g., activated by suspension), a checkbox is displayed before the name of the storyboard number field, or the name of the storyboard number field is switched to checkbox. The entire row of sheet cells in the sheet editing page may be selected by ticking the corresponding checkbox, wherein the selected row of sheet cells may be highlighted. The position of the sheet row in the sheet editing page may be further adjusted by dragging the selected sheet row.

In some possible embodiments, the sheet column in the sheet editing page may also be selected by activating the header, so as to adjust the position of the sheet column, wherein the sheet column when selected also may be displayed in highlights.

In some possible embodiments, the sheet row or sheet column of the sheet editing cell may also be deleted. For example, when the sheet row or the sheet column is selected, the editing function control may be called in a preset manner and the editing function control may be displayed in the form of a suspension layer. The corresponding sheet row or sheet column may be deleted by triggering a delete control in the editing function control, or the corresponding sheet cell may be selected and then the sheet content in the sheet cell may be deleted by triggering the corresponding delete control. During the execution of the deletion operation, a reminder may be provided again through a pop-up window. The deletion operation is only performed when the pop-up window is obtained to confirm the deletion operation.

In some possible embodiments, the sheet cells in the sheet editing page may also be combined depending on the actual scenario requirements. For example, there may be multiple image material footage areas belonging to the same name of the storyboard number field and the name of the video outline field, i.e., the present disclosure supports uploading a plurality of image material footages for the same storyboard shot.

Furthermore, in one embodiment of the present disclosure, an image material footage corresponding to the at least storyboard shot sent by a server is received, wherein the image material footage is filmed by the second device based on the filming indication information of the target storyboard shot, saved in the video editing draft and uploaded to the server, and the image material footage corresponding to the at least storyboard shot is input to a filling position in the sheet editing page corresponding to the name of the filmed video field.

For example, according to FIG. 9, in the scenario shown by FIG. 8, by triggering an "upload control" corresponding to the name of the filmed video field in the sheet editing page, the image material footage of the corresponding storyboard shot is input to a filling position in the sheet editing page corresponding to the name of the filmed video field.

In one embodiment of the present disclosure, the image material footage corresponding to the at least storyboard shot may also be input to a filling position in the sheet editing page corresponding to the name of the filmed video field by uploading a template material segment. For example, a plurality of preset candidate template material segments may be displayed by triggering an upload control on the preset template material segment. Further, the corresponding image material footage is selected from the candidate template material footage and input to the filling position corresponding to the name of the filmed video field in the sheet editing page.

During the actual execution, to further increase the speed for uploading the image material footage, the cover of the image material may be displayed at a filling position corresponding to the name of the filmed video field in the sheet editing page and a total speed for uploading the material may be displayed on the cover (wherein a grey mask layer may be displayed on the surface of the cover before the upload is completed). In case that multiple image material footages are uploaded simultaneously, each uploaded image material footage may be displayed in an uploading stage (i.e., displaying the total stage of uploading) or in a state of waiting for upload according to the scenario requirements.

Furthermore, when the upload of the image material footage is completed, the preview of the image material footage is supported. That is, the corresponding image material footage in the sheet editing page is clicked to call the image material footage and further preview the corresponding image material footage by a predetermined preview rule in the preview area.

It is to be explained that the above mentioned layout and style of the sheet editing page are only one possible implementation. During the actual execution, the sheet editing page may be any layout and style as long as the corresponding functions are fulfilled. The layout and style are not limited here. Besides, the above mentioned operation manner in the sheet editing page is just one possible embodiment. During the actual execution, any possible operations may be performed in the sheet editing page depending on the scenario requirements to satisfy the diversified editing needs. The possible operations would not be listed here.

In summary, the method for video editing according to the embodiments of the present disclosure may display the video editing operations in the form of the sheet editing page. The video may be flexibly edited through the operations in the sheet editing page, so as to satisfy the diversified video editing needs of the user.

With reference to the specific embodiments below, the method is then introduced from the second device side, wherein the second device side is used for obtaining the image material footage in the method for video editing which has been described above mainly from the first device side. The method for video editing which has been described above mainly from the first device side depicts detailed steps about how the video is edited according to the image material footage to obtain the target video. It will not be repeated here.

FIG. 10 illustrates a flowchart of a further method for video editing provided by the embodiments of the present disclosure. The method may be executed by the video editing apparatus in the second device, wherein the apparatus may be implemented by software and/or hardware and may generally be integrated in an electronic device corresponding to the second device. As shown in FIG. 10, the method comprises:

Step 1001: obtaining and displaying a video editing draft which records filming indication information of at least one storyboard shot, wherein the filming indication information indicates a filming mode feature and/or a filming content feature of an image material footage of the storyboard shot.

Step 1002: filming, in accordance with filming indication information of a target storyboard shot of the at least one storyboard shot, an image material footage of the target storyboard shot and saving it in the video editing draft.

In one embodiment of the present disclosure, a video editing draft which records filming indication information of at least one storyboard shot is obtained and displayed, wherein the filming indication information indicates a filming mode feature and/or a filming content feature of an image material footage of the storyboard shot. The filming editing operation may be understood as filming "script" of the video.

Moreover, when an image material footage of the target storyboard shot is filmed in accordance with filming indication information of a target storyboard shot of the at least one storyboard shot and saved in the video editing draft, the image material footage is in fact also filmed based on the above "script". In some possible embodiments, the image material footage may be updated by triggering a preset upload control of the upload position of the target storyboard shot in the video editing draft.

Therefore, in this embodiment, since the image material footage is filmed by a relatively portable second device, the image material footage is filmed in a more flexible way. Besides, in case of the cooperation among a plurality of second devices, the image material footage may be filmed more effectively, which further helps boosting the efficiency of the subsequent video editing.

In summary, the method for video editing according to the embodiments of the present disclosure includes obtaining and displaying a video editing draft which records filming indication information of at least one storyboard shot, wherein the filming indication information indicates a filming mode feature and/or a filming content feature of an image material footage of the storyboard shot; filming, in accordance with filming indication information of a target storyboard shot of the at least one storyboard shot, an image material footage of the target storyboard shot and saving it in the video editing draft, wherein editing operations of the video editing draft are performed in the first device. In the embodiments of the present disclosure, the efficiency of video editing is improved by the cooperation between the first device and the second device.

To fulfill the above embodiments, the present disclosure also proposes an apparatus for video editing.

Figure 11:
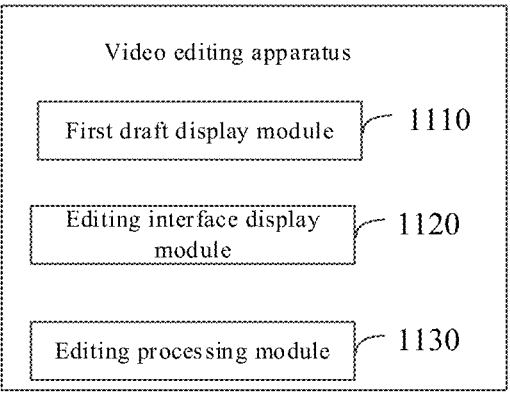
FIG. 11 illustrates a structural diagram of the apparatus for video editing provided by embodiments of the present disclosure

FIG. 11 illustrates a structural diagram of the apparatus for video editing provided by the embodiments of the present disclosure. The apparatus may be implemented by software and/or hardware and may generally be integrated in an electronic device corresponding to the first device. According to FIG. 11, the apparatus includes: a first draft displaying module 1110, an editing interface display module 1120 and an editing processing module 1130, wherein, the first draft displaying module 1110 is used for obtaining and displaying a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot;

the editing interface display module 1120 is provided for in response to a clipping instruction triggered for the video editing draft, displaying a video editing interface based on the video editing draft, wherein the video editing interface includes an editing track and at least one video track segment is placed on a video track of the editing track, the at least one video track segment being formed based on the image material footage of the at least one storyboard shot;

the editing processing module 1130 is used for in response to an editing operation for the video track segment, presenting on the editing track an operation indicator and on a preview player an editing effect produced by applying the editing operation to the image material footage, and generating a target video based on the editing operation applied on the video clipping interface and the image material footage.

The apparatus for video editing provided by the embodiments of the present disclosure may execute the method for video editing provided by any embodiments of the present disclosure mainly described from the first device side, include the corresponding functional modules for executing the method and achieve the advantageous effects.

To fulfill the above embodiments, the present disclosure also proposes an apparatus for video editing.

Wherein the second device side is used for obtaining the image material footage in the method for video editing which has been described above mainly from the first device side, and the apparatus for video editing mainly described from the first device side edits the video according to the image material footage to obtain the target video. The apparatus for video editing in this embodiment is provided for obtaining the image material footage.

Figure 12:
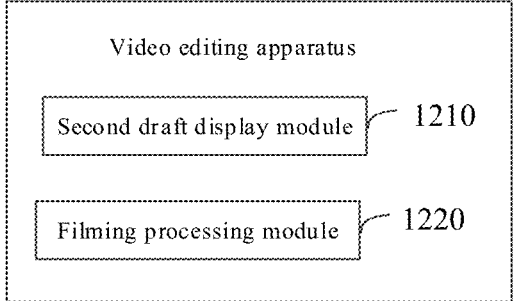
FIG. 12 illustrates a structural diagram of a further apparatus for video editing provided by embodiments of the present disclosure

FIG. 12 illustrates a structural diagram of the apparatus for video editing provided by the embodiments of the present disclosure. The apparatus may be implemented by software and/or hardware and may generally be integrated in an electronic device corresponding to the second device. According to FIG. 12, the apparatus includes: a second draft displaying module 1210 and a filming processing module 1220, wherein, the second draft displaying module 1210 is used for obtaining and displaying a video editing draft which records filming indication information of at least one storyboard shot, wherein the filming indication information indicates a filming mode feature and/or a filming content feature of an image material footage of the storyboard shot;

the filming processing module 1220 for filming, in accordance with filming indication information of a target storyboard shot of the at least one storyboard shot, an image material footage of the target storyboard shot and saving it in the video editing draft.

The apparatus for video editing provided by the embodiments of the present disclosure may execute the method for video editing provided by any embodiments of the present disclosure mainly described from the second device side, include the corresponding functional modules for executing the method and achieve the advantageous effects.

To fulfill the above embodiment, the present disclosure also proposes a computer program product comprising computer programs/instructions, which computer programs/instructions when executed by a processor fulfill the method for video editing in the above embodiment.

Figure 13:
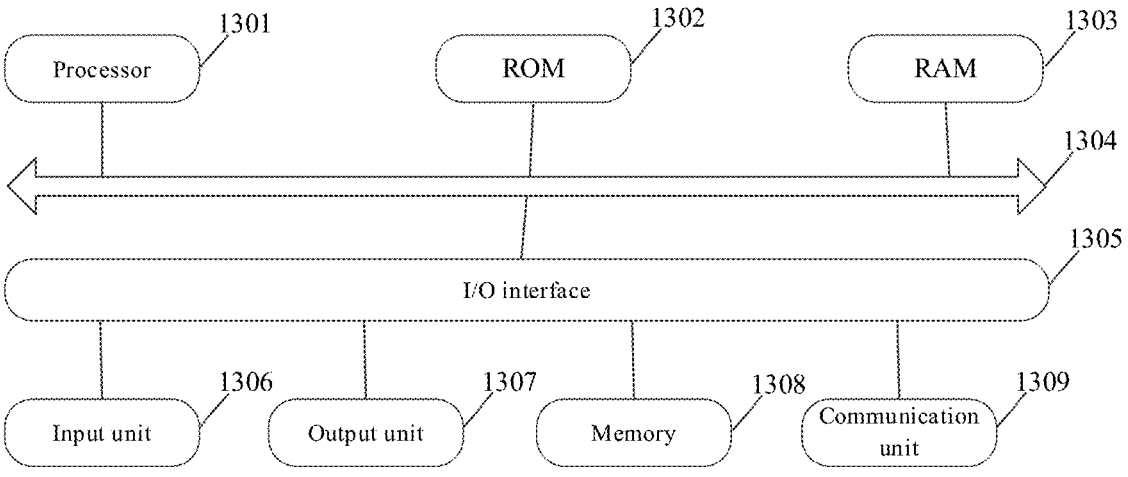
FIG. 13 illustrates a structural diagram of an electronic device provided by embodiments of the present disclosure.

FIG. 13 illustrates a structural diagram of an electronic device provided by the embodiments of the present disclosure.

With reference to FIG. 13, a structural diagram of an electronic device 1330 adapted to implement embodiments of the present disclosure is shown. In the embodiments of the present disclosure, the electronic device 1300 may include, but not limited to, mobile terminals, such as mobile phones, notebooks, digital broadcast receivers, PDAs (Personal Digital Assistant), PADs (tablet computer), PMPs (Portable Multimedia Player) and vehicle terminals (such as car navigation terminal) and fixed terminals, e.g., digital TVs and desktop computers etc. The electronic device shown in FIG. 13 is just an example and will not put any restrictions on the functions and application ranges of the embodiments of the present disclosure.

According to FIG. 13, the electronic device 1300 may include a processor (e.g., central processor, graphic processor and the like) 1301, which can execute various suitable actions and processing based on the programs stored in the read-only memory (ROM) 1302 or programs loaded in the random-access memory (RAM) 1303 from a storage unit 1308. The RAM 1303 can also store all kinds of programs and data required by the operations of the electronic device 1300. Processor 1301, ROM 1302 and RAM 1303 are connected to each other via a bus 1304. The input/output (I/O) interface 1305 is also connected to the bus 604.

Usually, input unit 1306 (including touch screen, touch-pad, keyboard, mouse, camera, microphone, accelerometer, gyroscope and like) and output unit 1307 (including liquid crystal display (LCD), speaker and vibrator etc.), storage unit 1308 (including tape and hard disk etc.) and communication unit 1309 may be connected to the I/O interface 1305. The communication unit 1309 may allow the electronic device 1300 to exchange data with other devices through wired or wireless communications. Although FIG. 13 illustrates the electronic device 1300 having various units, it is to be understood that it is not a prerequisite to implement or provide all illustrated units. Alternatively, more or less units may be implemented or provided.

In particular, in accordance with embodiments of the present disclosure, the process depicted above with reference to the flowchart may be implemented as computer software programs. For example, the embodiments of the present disclosure include a computer program product including computer programs carried on a non-transient computer readable medium, wherein the computer programs include program codes for executing the method demonstrated by the flowchart. In these embodiments, the computer programs may be loaded and installed from networks via the communication unit 1309, or installed from the storage unit 1308, or installed from the ROM 1302. The computer programs, when executed by the processor 1301, performs the above functions defined in the method for video editing according to the embodiments of the present disclosure.

It is to be explained the above disclosed computer readable medium may be computer readable signal medium or computer readable storage medium or any combinations thereof. The computer readable storage medium for example may include, but not limited to, electric, magnetic, optical, electromagnetic, infrared or semiconductor systems, apparatus or devices or any combinations thereof. Specific examples of the computer readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof. In the present disclosure, the computer readable storage medium may be any tangible medium that contains or stores programs. The programs may be utilized by instruction execution systems, apparatuses or devices in combination with the same.

In the present disclosure, the computer readable signal medium may include a data signal propagated in baseband or as part of a carrier wave, carrying computer readable program codes therein. Such propagated data signals may take many forms, including but not limited to, electromagnetic signals, optical signals, or any suitable combinations thereof. The computer readable signal medium may also be any computer readable medium in addition to the computer readable storage medium. The computer readable signal medium may send, propagate, or transmit programs for use by or in connection with instruction execution systems, apparatuses or devices. Program codes contained on the computer readable medium may be transmitted by any suitable media, including but not limited to: electric wires, fiber optic cables and RF (radio frequency) etc., or any suitable combinations thereof.

In some implementations, clients and servers may communicate with each other via any currently known or to be developed network protocols, such as HTTP (HyperText Transfer Protocol) and interconnect with digital data communications in any forms or media (such as communication networks). Examples of the communication networks include Local Area Network (LAN), Wide Area Network (WAN), internet work (e.g., Internet) and end-to-end network (such as ad hoc end-to-end network), and any currently known or to be developed networks.

The above computer readable medium may be included in the aforementioned electronic device or stand-alone without fitting into the electronic device.

The above computer readable medium bears one or more programs. When the above one or more programs are executed by the electronic device, the electronic device is enabled to: obtain and display a video editing draft which records filming indication information and an image material footage of at least one storyboard shot, wherein an image material footage of a target storyboard shot of the at least one storyboard shot is filmed by a second device based on the filming indication information of the target storyboard shot and saved in the video editing draft, and wherein the filming indication information of the target storyboard shot indicates a filming mode feature and/or a filming content feature of the image material footage of the target storyboard shot; in response to a clipping instruction triggered for the video editing draft, display a video editing interface based on the video editing draft, wherein the video editing interface includes an editing track and at least one video track segment is placed on a video track of the editing track, the at least one video track segment being formed based on the image material footage of the at least one storyboard shot; and in response to an editing operation for the video track segment, present on the editing track an operation indicator and on a preview player an editing effect produced by applying the editing operation to the image material footage, and generate a target video based on the editing operation applied on the video clipping interface and the image material footage. In the embodiments of the present disclosure, the first device cooperates with the second device, wherein the second device films the video and the first device edits the video, so as to improve the efficiency of video editing.

The electronic device may write computer program instructions for executing operations of the present disclosure in one or more programming languages or combinations thereof. The above programming languages include, but not limited to, object-oriented programming languages, e.g., Java, Smalltalk, C++ and so on, and traditional procedural programming languages, such as "C" language or similar programming languages. The program codes can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider).

The flow chart and block diagram in the drawings illustrate system architecture, functions and operations that may be implemented by system, method and computer program product according to various implementations of the present disclosure. In this regard, each block in the flow chart or block diagram can represent a module, a part of program segment or code, wherein the module and the part of program segment or code include one or more executable instruction for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Units described in the embodiments of the present disclosure may be implemented by software or hardware. In some cases, the name of the unit should not be considered as the restriction over the unit per se.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In the context of the present disclosure, machine readable medium may be tangible medium that may include or store programs for use by or in connection with instruction execution systems, apparatuses or devices. The machine readable medium may be machine readable signal medium or machine readable storage medium. The machine readable storage medium for example may include, but not limited to, electric, magnetic, optical, electromagnetic, infrared or semiconductor systems, apparatus or devices or any combinations thereof. Specific examples of the machine readable storage medium may include, but not limited to, electrical connection having one or more wires, portable computer disk, hard disk, random access memory (RAM), read-only memory (ROM), erasable programmable read only memory (EPROM or flash memory), fiber optics, portable compact disk read only memory (CD-ROM), optical storage device, magnetic storage device, or any suitable combinations thereof.

The above description only explains the preferred embodiments of the present disclosure and the technical principles applied. Those skilled in the art should understand that the scope of the present disclosure is not limited to the technical solution resulted from particular combinations of the above technical features, and meanwhile should also encompass other technical solutions formed from any combinations of the above technical features or equivalent features without deviating from the above disclosed inventive concept, such as the technical solutions formed by substituting the above features with the technical features disclosed here with similar functions.

Furthermore, although the respective operations are depicted in a particular order, it should be appreciated that the operations are not required to be completed in the particular order or in succession. In some cases, multitasking or multiprocessing is also beneficial. Likewise, although the above discussion comprises some particular implementation details, they should not be interpreted as limitations over the scope of the present disclosure. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter is already described by languages specific to structural features and/or method logic acts, it is to be appreciated that the subject matter defined in the attached claims is not limited to the above described particular features or acts. On the contrary, the above described particular features and acts are only example forms for implementing the claims.

I claim:

1. A method applied at a first device for video editing, the method comprising:

obtaining and displaying a video editing draft comprising filming indication information and an image material footage of at least one storyboard shot, wherein the image material footage was filmed by a second device based on the filming indication information and saved in the video editing draft, and wherein the filming indication information indicates at least one of a filming mode feature or a filming content feature of the image material footage;

in response to receiving a clipping instruction associated with the video editing draft, displaying a video editing interface that includes a video editing track, a preview player area, and a video editing area, wherein at least one video track segment is placed on the video editing track, wherein the at least one video track segment is formed based on the image material footage, and wherein the video editing area comprises at least one video editing control;

receiving user input on the at least one video editing control, wherein the user input is indicative of an editing operation to be performed on the at least one video track segment; and in response to receiving the user input on the at least one video editing control, presenting, on the video editing track, an operation indicator, wherein the operation indicator is configured to visually distinguish the at least one video track segment being edited;

presenting, in the preview player area, an editing effect produced by applying the editing operation to the at least one video track segment; and generating a target video based on applying the editing operation to the at least one video track segment.

2. The method of claim 1, further comprising, before obtaining and displaying the video editing draft:

in response to a video draft editing instruction sent by a user, displaying a sheet editing page to be edited, wherein the sheet editing page includes: a name of storyboard description field corresponding to the at least one storyboard shot, a name of filmed video field and a name of filming mode field;

receiving the filming content feature corresponding to the name of the storyboard description field and input to the sheet editing page by the first device, wherein the filming content feature indicates the image material footage; and receiving the filming mode feature corresponding to the name of the filming mode field and input to the sheet editing page by the first device.

3. The method of claim 2, wherein the name of the filming mode field includes: a name of shooting scale field, and/or a name of camera movement field, and an input method of the filming mode feature includes:

in response to an operation for triggering a control corresponding to the name of the shooting scale field, displaying a plurality of optional candidate shooting scales and inputting a target shooting scale selected from the candidate shooting scales to a filling position corresponding to the name of the shooting scale field; and/or, in response to an operation for triggering a control corresponding to the name of the camera movement field, displaying a plurality of optional candidate camera movements and inputting a target camera movement selected from the candidate camera movements to a filling position corresponding to the name of the camera movement field.

4. The method of claim 2, further comprising:

receiving the image material footage from a server, wherein the image material footage is filmed by the second device based on the filming indication information of the at least one storyboard shot, saved in the video editing draft and uploaded to the server;

inputting the image material footage corresponding to the at least storyboard shot to a filling position in the sheet editing page corresponding to the name of the filmed video field.

5. The method of claim 2, wherein the sheet editing page further includes a name of video extension field, and the method further comprises:

receiving and displaying video extension editing information corresponding to the name of the video extension field input to the table editing page by the first device, wherein the name of the video extension field includes: a combination of one or more of a name of storyboard number field, a name of video outline field, a name of lines text field, a name of memo field.

6. The method of claim 1, the method further comprising, before receiving the clipping instruction associated with the video editing draft:

in response to a clipping instruction for a target image material footage selected from the video editing draft, displaying a clipping interface of the target image material footage;

obtaining, in accordance with a clipping operation on the target image material footage by the user in the clipping interface, a clipped and updated image material footage, and substituting the target image material footage with the updated image material footage in the video editing draft.

7. The method of claim 1, further comprising, before generating the target video:

placing on a lines track of the video editing track at least one lines track segment, the at least one lines track segment being formed based on lines text of the at least one storyboard shot;

in response to an editing operation for the line track segment, displaying, on the video editing track, an operation indicator and displaying, in the preview player area, an editing effect resulted from applying the editing operation on the lines text.

8. A method for video editing applied at a second device, comprising:

obtaining and displaying a video editing draft comprising filming indication information of at least one storyboard shot, wherein the filming indication information indicates at least one of a filming mode feature or a filming content feature of an image material footage of the at least one storyboard shot;

filming, based on the filming indication information, an image material footage and saving it in the video editing draft, wherein the video editing draft is a video editable by a first device according to a method comprising:

obtaining and displaying the video editing draft comprising the filming indication information and the image material footage;

in response to receiving a clipping instruction associated with the video editing draft, displaying a video editing interface that includes a video editing track, a preview player area, and a video editing area, wherein at least one video track segment is placed on the video editing track, wherein the at least one video track segment is formed based on the image material footage, and wherein the video editing area comprises at least one video editing control;

receiving user input on the at least one video editing control, wherein the user input is indicative of an editing operation to be performed on the at least one video track segment;

in response to receiving the user input on the at least one video editing control, presenting, on the video editing track, an operation indicator, wherein the operation indicator is configured to visually distinguish the at least one video track segment being edited;

presenting, in the preview player area, an editing effect produced by applying the editing operation to the at least one video track segment; and generating a target video based on applying the editing operation to the at least one video track segment.

9. A first electronic device characterized in comprising:

a processor; and a memory storing instructions executable by the processor;

wherein the processor is configured to read the instructions from the memory and execute the instructions to implement a method comprising:

obtaining and displaying a video editing draft comprising filming indication information and an image material footage of at least one storyboard shot, wherein the image material footage was filmed by a second device based on the filming indication information and saved in the video editing draft, and wherein the filming indication information indicates at least one of a filming mode feature or a filming content feature of the image material footage;

in response to receiving a clipping instruction associated with the video editing draft, displaying a video editing interface that includes a video editing track, a preview player area, and a video editing area, wherein at least one video track segment is placed on the video editing track, wherein the at least one video track segment is formed based on the image material footage, and wherein the video editing area comprises at least one video editing control;

receiving user input on the at least one video editing control, wherein the user input is indicative of an editing operation to be performed on the at least one video track segment; and in response to receiving the user input on the at least one video editing control, presenting, on the video editing track, an operation indicator, wherein the operation indicator is configured to visually distinguish the at least one video track segment being edited;

presenting, in the preview player area, an editing effect produced by applying the editing operation to the at least one video track segment; and generating a target video based on applying the editing operation to the at least one video track segment.

10. The first electronic device of claim 9, wherein the method further comprises, before obtaining and displaying the video editing draft:

in response to a video draft editing instruction sent by a user, displaying a sheet editing page to be edited, wherein the sheet editing page includes: a name of storyboard description field corresponding to the at least one storyboard shot, a name of filmed video field and a name of filming mode field;

receiving the filming content feature corresponding to the name of the storyboard description field and input to the sheet editing page by the first device, wherein the filming content feature indicates the image material footage; and receiving the filming mode feature corresponding to the name of the filming mode field and input to the sheet editing page by the first device.

11. The first electronic device of claim 10, wherein the name of the filming mode field includes: a name of shooting scale field, and/or a name of camera movement field, and an input method of the filming mode feature includes:

in response to an operation for triggering a control corresponding to the name of the shooting scale field, displaying a plurality of optional candidate shooting scales and inputting a target shooting scale selected from the candidate shooting scales to a filling position corresponding to the name of the shooting scale field; and/or, in response to an operation for triggering a control corresponding to the name of the camera movement field, displaying a plurality of optional candidate camera movements and inputting a target camera movement selected from the candidate camera movements to a filling position corresponding to the name of the camera movement field.

12. The first electronic device of claim 10, the method further comprising:

receiving the image material footage from a server, wherein the image material footage is filmed by the second device based on the filming indication information of the at least one storyboard shot, saved in the video editing draft and uploaded to the server;

inputting the image material footage corresponding to the at least storyboard shot to a filling position in the sheet editing page corresponding to the name of the filmed video field.

13. The first electronic device of claim 10, wherein the sheet editing page further includes a name of video extension field, and the method further comprises:

receiving and displaying video extension editing information corresponding to the name of the video extension field input to the table editing page by the first device, wherein the name of the video extension field includes: a combination of one or more of a name of storyboard number field, a name of video outline field, a name of lines text field, a name of memo field.

14. The first electronic device of claim 9, wherein the method further comprises, before receiving the clipping instruction associated with the video editing draft:

in response to a clipping instruction for a target image material footage selected from the video editing draft, displaying a clipping interface of the target image material footage;

obtaining, in accordance with a clipping operation on the target image material footage by the user in the clipping interface, a clipped and updated image material footage, and substituting the target image material footage with the updated image material footage in the video editing draft.

15. The first electronic device of claim 9, the method further comprising, before generating the target video:

placing on a lines track of the video editing track at least one lines track segment, the at least one lines track segment being formed based on lines text of the at least one storyboard shot;

in response to an editing operation for the line track segment, displaying, on the video editing track, an operation indicator and displaying, in the preview player area, an editing effect resulted from applying the editing operation on the lines text.

16. A non-transitory computer-readable storage medium characterized in that the computer-readable storage medium stores computer programs for executing the method comprising:

obtaining and displaying a video editing draft comprising filming indication information and an image material footage of at least one storyboard shot, wherein the image material footage was filmed by a second device based on the filming indication information and saved in the video editing draft, and wherein the filming indication information indicates at least one of a filming mode feature or a filming content feature of the image material footage;

in response to receiving a clipping instruction associated with the video editing draft, displaying a video editing interface that includes a video editing track, a preview player area, and a video editing area, wherein at least one video track segment is placed on the video editing track, wherein the at least one video track segment is formed based on the image material footage, and wherein the video editing area comprises at least one video editing control;

receiving user input on the at least one video editing control, wherein the user input is indicative of an editing operation to be performed on the at least one video track segment; and in response to receiving the user input on the at least one video editing control, presenting, on the video editing track, an operation indicator, wherein the operation indicator is configured to visually distinguish the at least one video track segment being edited;

presenting, in the preview player area, an editing effect produced by applying the editing operation to the at least one video track segment; and generating a target video based on applying the editing operation to the at least one video track segment.

17. The non-transitory computer-readable storage medium of claim 16, wherein the method further comprises, before obtaining and displaying the video editing draft:

in response to a video draft editing instruction sent by a user, displaying a sheet editing page to be edited, wherein the sheet editing page includes: a name of storyboard description field corresponding to the at least one storyboard shot, a name of filmed video field and a name of filming mode field;

receiving the filming content feature corresponding to the name of the storyboard description field and input to the sheet editing page by the first device, wherein the filming content feature indicates the image material footage; and receiving the filming mode feature corresponding to the name of the filming mode field and input to the sheet editing page by the first device.

18. The non-transitory computer-readable storage medium of claim 17, wherein the name of the filming mode field includes: a name of shooting scale field, and/or a name of camera movement field, and an input method of the filming mode feature includes:

in response to an operation for triggering a control corresponding to the name of the shooting scale field, displaying a plurality of optional candidate shooting scales and inputting a target shooting scale selected from the candidate shooting scales to a filling position corresponding to the name of the shooting scale field; and/or, in response to an operation for triggering a control corresponding to the name of the camera movement field, displaying a plurality of optional candidate camera movements and inputting a target camera movement selected from the candidate camera movements to a filling position corresponding to the name of the camera movement field.

19. The non-transitory computer-readable storage medium of claim 18, wherein the method further comprises:

receiving the image material footage from a server, wherein the image material footage is filmed by the second device based on the filming indication information of the at least one storyboard shot, saved in the video editing draft and uploaded to the server;

inputting the image material footage corresponding to the at least storyboard shot to a filling position in the sheet editing page corresponding to the name of the filmed video field.

20. A second electronic device characterized in comprising:

a processor; and a memory storing instructions executable by the processor;

wherein the processor is configured to read the instructions from the memory and execute the instructions to implement a method comprising:

obtaining and displaying a video editing draft comprising filming indication information of at least one storyboard shot, wherein the filming indication information indicates at least one of a filming mode feature or a filming content feature of an image material footage of the at least one storyboard shot;

filming, based on the filming indication information, an image material footage and saving it in the video editing draft, wherein the video editing draft is a video editable by a first electronic device to obtain a target video, wherein the target video is obtained by:

obtaining and displaying the video editing draft comprising the filming indication information and the image material footage;

in response to receiving a clipping instruction associated with the video editing draft, displaying a video editing interface that includes a video editing track, a preview player area, and a video editing area, wherein at least one video track segment is placed on the video editing track, wherein the at least one video track segment is formed based on the image material footage, and wherein the video editing area comprises at least one video editing control;

receiving user input on the at least one video editing control, wherein the user input is indicative of an editing operation to be performed on the at least one video track segment;

in response to receiving the user input on the at least one video editing control, presenting, on the video editing track, an operation indicator, wherein the operation indicator is configured to visually distinguish the at least one video track segment being edited;

presenting, in the preview player area, an editing effect produced by applying the editing operation to the at least one video track segment; and generating the target video based on applying the editing operation to the at least one video track segment.

* * * * *